United States Patent
Seyfried et al.

(10) Patent No.: US 12,018,149 B2
(45) Date of Patent: Jun. 25, 2024

(54) AQUEOUS POLYORGANOSILOXANE HYBRID RESIN DISPERSION

(71) Applicant: Evonik Operations GmbH, Essen (DE)

(72) Inventors: Mona Seyfried, Essen (DE); Stefan Silber, Krefeld (DE); Berend-Jan de Gans, Muelheim an der Ruhr (DE); Michael Fiedel, Essen (DE); Markus Hallack, Schermbeck (DE)

(73) Assignee: Evonik Operations GmbH, Essen (DE)

(*) Notice: Subject to any disclaimer, the term of this patent is extended or adjusted under 35 U.S.C. 154(b) by 118 days.

(21) Appl. No.: 16/834,781

(22) Filed: Mar. 30, 2020

(65) Prior Publication Data

US 2020/0308406 A1 Oct. 1, 2020

(30) Foreign Application Priority Data

Apr. 1, 2019 (EP) .................................. 19166481

(51) Int. Cl.
  C08L 83/04 (2006.01)
  C08J 3/07 (2006.01)
  C08L 67/02 (2006.01)
  C09D 167/02 (2006.01)
  C09D 183/04 (2006.01)

(52) U.S. Cl.
  CPC ............... *C08L 83/04* (2013.01); *C08J 3/07* (2013.01); *C08L 67/025* (2013.01); *C09D 167/025* (2013.01); *C09D 183/04* (2013.01); *C08J 2367/02* (2013.01); *C08J 2383/04* (2013.01); *C08J 2467/02* (2013.01); *C08J 2483/04* (2013.01); *C08L 2201/54* (2013.01); *C08L 2205/025* (2013.01); *C08L 2205/035* (2013.01)

(58) Field of Classification Search
  CPC ........ C08L 83/04; C08L 67/025; C08L 67/02; C08L 83/06; C08L 83/08; C08L 83/10; C09D 183/10; C09D 183/12; C09D 183/04; C09D 183/06; C09D 183/08
  USPC ........................................................ 525/446
  See application file for complete search history.

(56) References Cited

U.S. PATENT DOCUMENTS

| | | | |
|---|---|---|---|
| 4,954,554 A * | 9/1990 | Bunge | C08J 3/03 524/386 |
| 5,401,871 A | 3/1995 | Feldmann-Krane et al. | |
| 5,613,988 A | 3/1997 | Spiegler et al. | |
| 5,733,971 A | 3/1998 | Feldmann-Krane et al. | |
| 5,753,733 A * | 5/1998 | Eck | C04B 24/42 524/265 |
| 5,804,099 A | 9/1998 | Heilen et al. | |
| 5,863,966 A | 1/1999 | Ebbrecht et al. | |
| 5,977,282 A | 11/1999 | Ebbrecht et al. | |
| 5,994,415 A | 11/1999 | Grüning et al. | |
| 6,054,534 A | 4/2000 | Josten et al. | |
| 6,194,596 B1 | 2/2001 | Josten et al. | |
| 6,218,459 B1 | 4/2001 | Gruning et al. | |
| 6,235,813 B1 | 5/2001 | Brandt et al. | |
| 6,268,521 B1 | 7/2001 | Gruning et al. | |
| 6,288,129 B1 | 9/2001 | Gruning et al. | |
| 6,297,331 B1 | 10/2001 | Feldmann-Krane et al. | |
| 6,310,123 B1 | 10/2001 | Boinowitz et al. | |
| 6,353,068 B1 | 3/2002 | Dietz et al. | |
| 6,391,831 B1 | 5/2002 | Ebbrecht et al. | |
| 6,420,324 B1 | 7/2002 | Ebbrecht et al. | |
| 6,423,785 B1 | 7/2002 | Esselbom et al. | |
| 6,433,028 B1 | 8/2002 | Ebbrecht et al. | |
| 6,451,863 B1 | 9/2002 | Ebbrecht et al. | |
| 6,552,091 B1 | 4/2003 | Boinowitz et al. | |
| 6,689,731 B2 | 2/2004 | Esselborn et al. | |
| 6,794,445 B2 | 9/2004 | Reusmann et al. | |
| 6,835,420 B1 | 12/2004 | Röckrath et al. | |
| 6,858,663 B2 | 2/2005 | Knott et al. | |
| 6,861,493 B2 | 3/2005 | Bauer et al. | |
| 7,018,458 B2 | 3/2006 | Knott et al. | |
| 7,118,619 B2 | 10/2006 | Brandt et al. | |
| 7,189,772 B2 | 3/2007 | Bauer et al. | |
| 7,393,396 B2 | 7/2008 | Lehmann et al. | |
| 7,399,348 B2 | 7/2008 | Blanda et al. | |
| 7,442,724 B2 | 10/2008 | Esselborn et al. | |

(Continued)

FOREIGN PATENT DOCUMENTS

| CN | 107573474 | 1/2018 |
|---|---|---|
| DE | 2835443 | 2/1980 |

(Continued)

OTHER PUBLICATIONS

European Search Report dated Sep. 23, 2019 in European Application No. EP19166481.2, 7 pages.
Indian Office Action dated May 31, 2023, in Indian Application No. 202044014290, with English translation, 7 pages.
U.S. Appl. No. 09/827,584, filed Apr. 5, 2001, 2002/0019459, Albrecht et al.
U.S. Appl. No. 10/245,074, filed Sep. 17, 2002, 2004/0063818, Silber et al.
U.S. Appl. No. 10/413,116, filed Apr. 14, 2003, 2004/0024089, Busch et al.

(Continued)

*Primary Examiner* — Margaret G Moore
(74) *Attorney, Agent, or Firm* — Grüneberg and Myers PLLC

(57) ABSTRACT

An aqueous polyorganosiloxane hybrid resin dispersion includes at least one polyorganosiloxane hybrid resin and at least one emulsifier based on partly hydrolysed polyvinylacetates. The dispersion has a solids content of 30.0% by weight-70.0% by weight, preferably 45.0% by weight-55.0% by weight, based on the polyorganosiloxane hybrid resin dispersion, and the residual solvent content is <6.0% by weight, preferably <2.5% by weight, more preferably <1.0% by weight, based on the polyorganosiloxane hybrid resin dispersion.

13 Claims, No Drawings

(56) References Cited

U.S. PATENT DOCUMENTS

| | | | |
|---|---|---|---|
| 8,034,848 B2 | 10/2011 | Landers et al. | |
| 8,247,525 B2 | 8/2012 | Schubert et al. | |
| 8,268,939 B2 | 9/2012 | Ebbrecht et al. | |
| 8,455,603 B2 | 6/2013 | Ferenz et al. | |
| 8,557,944 B2 | 10/2013 | Henning et al. | |
| 8,633,291 B2 | 1/2014 | Ebbrecht et al. | |
| 8,729,207 B2 | 5/2014 | Hartung et al. | |
| 8,772,423 B2 | 7/2014 | De Gans et al. | |
| 8,822,565 B2 | 9/2014 | Martin et al. | |
| 8,993,706 B2 | 3/2015 | Schubert et al. | |
| 9,138,385 B2 | 9/2015 | Dahl et al. | |
| 9,266,825 B2 | 2/2016 | Lomoelder et al. | |
| 9,346,919 B2 | 5/2016 | Jazkewitsch et al. | |
| 9,353,225 B2 | 5/2016 | Knott et al. | |
| 9,353,289 B2 | 5/2016 | De Gans et al. | |
| 9,481,695 B2 | 11/2016 | Knott et al. | |
| 9,790,327 B2 | 10/2017 | Klotzbach et al. | |
| 9,796,876 B2 | 10/2017 | Lomoelder et al. | |
| 9,896,541 B2 | 2/2018 | Fiedel et al. | |
| 9,902,095 B2 | 2/2018 | Stapperfenne et al. | |
| 9,902,096 B2 | 2/2018 | Stapperfenne et al. | |
| 10,100,207 B2 | 10/2018 | Stache et al. | |
| 10,106,644 B2 | 10/2018 | Fiedel et al. | |
| 10,106,649 B2 | 10/2018 | Fiedel et al. | |
| 10,239,898 B2 | 3/2019 | Hallack et al. | |
| 10,287,454 B2 | 5/2019 | Klotzbach et al. | |
| 10,457,769 B2 | 10/2019 | Günther et al. | |
| 10,626,291 B2 | 4/2020 | Hallack et al. | |
| 10,633,555 B2 | 4/2020 | Stache et al. | |
| 10,703,851 B2 | 7/2020 | Günther et al. | |
| 10,787,464 B2 | 9/2020 | Fiedel et al. | |
| 10,793,662 B2 | 10/2020 | Günther et al. | |
| 10,800,885 B2 | 10/2020 | Fiedel et al. | |
| 11,021,608 B2 | 6/2021 | Seyfried et al. | |
| 2002/0011183 A1 | 1/2002 | Esselborn et al. | |
| 2002/0019459 A1 | 2/2002 | Albrecht et al. | |
| 2003/0166770 A1 | 9/2003 | Bauer et al. | |
| 2003/0198819 A1 | 10/2003 | Reusmann et al. | |
| 2004/0024089 A1 | 2/2004 | Busch et al. | |
| 2004/0060473 A1 | 4/2004 | Bauer et al. | |
| 2004/0063818 A1 | 4/2004 | Silber et al. | |
| 2004/0152828 A1 | 8/2004 | Brandt et al. | |
| 2004/0229768 A1 | 11/2004 | Blanda et al. | |
| 2004/0229964 A1 | 11/2004 | Knott et al. | |
| 2005/0085563 A1 | 4/2005 | Esselborn et al. | |
| 2005/0107523 A1 | 5/2005 | Gippert et al. | |
| 2005/0183628 A1 | 8/2005 | Lchmann et al. | |
| 2005/0257717 A1 | 11/2005 | Knott et al. | |
| 2006/0293440 A1* | 12/2006 | Tseitlin | C08L 83/04 524/557 |
| 2007/0197678 A1 | 8/2007 | Cavaleiro et al. | |
| 2007/0203307 A1 | 8/2007 | Cavaleiro et al. | |
| 2007/0213226 A1 | 9/2007 | Sieverding et al. | |
| 2008/0034794 A1 | 2/2008 | Ebbrecht et al. | |
| 2009/0012197 A1 | 1/2009 | Landers et al. | |
| 2009/0053552 A1 | 2/2009 | De Gans et al. | |
| 2010/0036011 A1 | 2/2010 | De Gans et al. | |
| 2010/0184913 A1 | 7/2010 | Ebbrecht et al. | |
| 2011/0009553 A1 | 1/2011 | Heller et al. | |
| 2011/0042004 A1 | 2/2011 | Schubert et al. | |
| 2011/0230619 A1 | 9/2011 | Kuppert et al. | |
| 2011/0230633 A1 | 9/2011 | Ferenz et al. | |
| 2011/0281973 A1 | 11/2011 | Schubert et al. | |
| 2012/0010302 A1 | 1/2012 | Hartung et al. | |
| 2012/0071564 A1 | 3/2012 | De Gans et al. | |
| 2012/0097883 A1 | 4/2012 | Henning et al. | |
| 2013/0213267 A1 | 8/2013 | Fiedel et al. | |
| 2013/0217930 A1 | 8/2013 | Haensel et al. | |
| 2014/0134125 A1 | 5/2014 | Dahl et al. | |
| 2014/0303065 A1 | 10/2014 | Jazkewitsch et al. | |
| 2015/0023900 A1 | 1/2015 | Knott et al. | |
| 2015/0057412 A1 | 2/2015 | Knott et al. | |
| 2015/0073069 A1 | 3/2015 | De Gans et al. | |
| 2015/0191625 A1 | 7/2015 | Lomoelder et al. | |
| 2015/0225337 A1 | 8/2015 | Lomoelder et al. | |
| 2015/0321392 A1 | 11/2015 | Stapperfenne et al. | |
| 2015/0321393 A1 | 11/2015 | Stapperfenne et al. | |
| 2016/0017165 A1 | 1/2016 | Numrich et al. | |
| 2016/0108280 A1 | 4/2016 | Hallack et al. | |
| 2016/0160081 A1 | 6/2016 | Klotzbach et al. | |
| 2016/0208050 A1 | 7/2016 | Klotzbach et al. | |
| 2016/0297974 A1 | 10/2016 | Stache et al. | |
| 2017/0081464 A1 | 3/2017 | Fiedel et al. | |
| 2017/0081469 A1 | 3/2017 | Fiedel et al. | |
| 2017/0088667 A1 | 3/2017 | Fiedel et al. | |
| 2017/0152343 A1 | 6/2017 | Günther et al. | |
| 2017/0174817 A1 | 6/2017 | Günther et al. | |
| 2017/0283654 A1* | 10/2017 | Sandmeyer | C09D 183/04 |
| 2017/0298250 A1 | 10/2017 | Anselmann et al. | |
| 2018/0179234 A1 | 6/2018 | Hallack et al. | |
| 2018/0194889 A1 | 7/2018 | Günther et al. | |
| 2019/0048224 A1 | 2/2019 | Stache et al. | |
| 2019/0092904 A1 | 3/2019 | Fiedel et al. | |
| 2019/0112502 A1 | 4/2019 | Sloot et al. | |
| 2019/0241741 A1 | 8/2019 | Seyfried et al. | |
| 2020/0115562 A1 | 4/2020 | Fiedel et al. | |
| 2022/0033587 A1 | 2/2022 | Knott et al. | |

FOREIGN PATENT DOCUMENTS

| | | | |
|---|---|---|---|
| DE | 44 15 322 | | 11/1995 |
| DE | 10 2008 000 585 | | 9/2009 |
| EP | 0 117 607 | | 9/1984 |
| EP | 0 695 794 | | 2/1996 |
| EP | 0 785 240 | | 7/1997 |
| EP | 0 931 806 | | 7/1999 |
| EP | 0680991 | | 8/1999 |
| EP | 0 940 458 | | 9/1999 |
| EP | 1 375 568 | | 1/2004 |
| EP | 1 533 333 | | 5/2005 |
| EP | 2 198 932 | | 6/2010 |
| WO | 2010/046181 | | 4/2010 |
| WO | 2014/135353 | | 9/2014 |
| WO | 2015/091901 | * | 6/2015 |
| WO | 2016/020137 | | 2/2016 |
| WO | 2016/020140 | | 2/2016 |
| WO | 2016/020200 | | 2/2016 |
| WO | 2016/020201 | | 2/2016 |
| WO | 2018/134291 | | 7/2018 |
| WO | 2019/076552 | | 4/2019 |
| WO | 2020/114762 | | 6/2020 |

OTHER PUBLICATIONS

U.S. Appl. No. 11/677,244, filed Feb. 21, 2007, 2007/0197678, Cavaleiro et al.

U.S. Appl. No. 11/685,438, filed Mar. 13, 2007, 2007/0213226, Sieverding et al.

U.S. Appl. No. 11/677,821, filed Feb. 22, 2007, 2007/0203307, Cavaleiro et al.

U.S. Appl. No. 12/196,404, filed Aug. 22, 2008, 2009/0053552, De Gans et al.

U.S. Appl. No. 12/364,283, filed Feb. 2, 2009, 2010/0036011, De Gans et al.

U.S. Appl. No. 13/031,324, filed Feb. 21, 2011, 2011/0230619, Kuppert et al.

U.S. Appl. No. 13/771,921, filed Feb. 20, 2013, 2013/0213267, Fiedel et al.

U.S. Appl. No. 13/771,973, filed Feb. 20, 2013, 2013/0217930, Haensel et al.

U.S. Appl. No. 14/772,019, filed Sep. 1, 2015, 2016/0017165, Numrich et al.

U.S. Appl. No. 15/510,282, filed Mar. 10, 2017, 2017/0298250, Anselmann et al.

U.S. Appl. No. 16/712,580, filed Dec. 12, 2019, 2020/0115562, Fiedel et al.

U.S. Appl. No. 16/142,408, filed Sep. 26, 2018, 2019/0112502, Sloot et al.

(56) References Cited

OTHER PUBLICATIONS

Singapore Written Opinion dated Mar. 14, 2023, in Singapore Application No. 10202002751U, 9 pages.

* cited by examiner

AQUEOUS POLYORGANOSILOXANE HYBRID RESIN DISPERSION

CROSS-REFERENCE TO RELATED APPLICATION

The present application claims benefit to European application EP 19166481.2, filed on Apr. 1, 2019, which is incorporated by reference in its entirety.

BACKGROUND OF THE INVENTION

Field of the Invention

The present invention relates to aqueous polyorganosiloxane hybrid resin dispersions, to preparation processes therefor and to the use thereof.

Discussion of the Background

Pure silicone resins, called polyorganosiloxanes, are known for their thermal stability and weathering stability. They are used for impregnation on concrete, in coatings of high thermal stability, or in weather-resistant exterior coatings. In order to increase the stability of polyorganosiloxanes. They are modified with other polymers. The mutual chemical linkage of the silicone resins with these polymers takes place in an early phase of the preparation process.

Known organic-modified polyorganosiloxane resins, called polyorganosiloxane hybrid resins hereinafter, are silicone-alkyd resins, silicone-polyester resins, silicone-epoxide hybrid resins, silicone-polyurethane resins and silicone-polyacrylate resins. It is thus possible to combine the positive properties of pure silicone resins, such as thermal stability, weathering stability and low surface tension, with the positive properties of polyesters, for example, such as low thermoplasticity, high elasticity and good pigment wetting.

The properties of silicone-polyester resins have been found to be particularly advantageous in the decorative coating of thermally durable domestic appliances such as toasters, sunlamp housings, fan heaters and stoves, and the outside coating of deep fat fryers, pots and pans.

Coatings of domestic articles additionally have to be detergent-resistant. This means that they have to withstand cleaning in a machine dishwasher, which is customary nowadays, in the presence of surfactant-containing and highly alkaline cleaning compositions permanently without damage. The detergent resistance of a coating is generally determined by the lacquer formulation, but especially by the resin used.

The properties of the epoxy resins can also be combined with the properties of the silicone resins. These silicone-epoxy hybrid resins, by comparison with pure silicone resins, are notable for better metal adhesion and corrosion protection, and better stability to chemicals. A typical application is exhaust pipe coatings, but also paint systems for ceramic substrates such as any kind of stoneware, or concrete. Coating systems of this kind are also used in the shipping sector, for instance for coating of ship's hulls, marine installations below and above the sea surface, and harbour facilities.

Typically, polyorganosiloxane hybrid resins are provided in an organic solvent, for example aromatic hydrocarbons, esters, ethers or ketones, for example xylene, toluene, Solvesso and methoxypropyl acetate, ethyl acetate and butyl acetate. The advantage of solvent-borne formulations lies in the ease of applicability, good levelling properties and the formation of an initial film on the substrate. The polyorganosiloxane hybrid resin films can be physically dried, reactively cured as a 2-component system or baked. Systems that cure at room temperature are also known.

However, solvent-borne systems have toxicological and ecological disadvantages. The high content of combustible solvents, some of which are hazardous to health, is being viewed increasingly critically for reasons of health and safety and environmental protection. In addition, the use of solvents is increasingly subject to legal regulations worldwide. In many cases, moreover, environmental labels (Blue Angel, Nordic Swan, etc.) or industry standards along the value creation chain (RAL, IKEA, etc.) are requiring the complete elimination or drastic reduction of solvents.

There is therefore a constant search for low-solvent or entirely solvent-free systems. The related art describes numerous proposed solutions for pure silicone resins, called polyorganosiloxanes.

EP 098 940 describes a process in which a liquid oligomeric siloxane is emulsified with polyvinyl alcohol or a cellulose ether, in which case the condensation of the liquid oligoorganosiloxane in this emulsion gives a high-viscosity or solid polyorganosiloxane. The disadvantages of this process lie in additional technological complexity since the synthesis of the liquid oligomeric siloxane requires a different methodology than the synthesis of the polymeric organosiloxanes and the condensation in the emulsion is controllable only with difficulty.

DE 21 58 348 describes a process for preparing emulsions based on high-viscosity siloxanes cross-linkable to rubbers, in which a highly dilute preliminary emulsion containing at least 150% water and at least 80% emulsifier, based on the siloxane, is prepared and this emulsion is concentrated by distilling off a solvent/water mixture. This process requires a comparatively high amount of emulsifier, which is undesirable in many applications owing to the significant change in the performance profile and also increases the costs. The maximum siloxane content is 45%, and 5% to 7% solvent remains in the emulsion.

DE 44 15 322 A1 describes a process for preparing aqueous silicone resin emulsions using a polymeric organosilicon compound dissolved in an organic solvent, for example toluene, wherein, after addition of an emulsifier mixture consisting of an ethoxylated triglyceride and an ethoxylated tridecyl alcohol and water to the polymeric organosilicon compound and attainment of a homogeneous mixture which is no longer free-flowing, the organic solvent is removed as a solvent/water mixture before, subsequently, the amount of water required for the attainment of the desired final concentration and optionally known additives are incorporated homogeneously. There is no indication in this document that this process is suitable for other resins, for example polyorganosiloxane hybrid resins, than the polyorganosiloxanes described.

Also known from the related art is WO 2015/091901, which describes an aqueous dispersion of silicone-modified polyester resins, wherein the residual solvent content of the aqueous dispersion in relation to the solids content of the silicone-modified polyester resin in the dispersion, by virtue of the process described in the document, cannot reach less than 6% by weight. This disadvantage was demonstrated in the comparative example.

It was therefore an object of the present invention to provide an aqueous polyorganosiloxane hybrid resin dispersion usable in various coatings without significant impairment of the other coating properties and the utility value for the respective application, and for the residual solvent content in relation to the solids content to be lower than known in the related art.

SUMMARY OF THE INVENTION

The invention includes the following embodiments, and the object was surprisingly achieved by an aqueous polyorganosiloxane hybrid resin dispersion according to embodiment 1.

1. Aqueous polyorganosiloxane hybrid resin dispersion comprising
   at least one polyorganosiloxane hybrid resin, where the polyorganosiloxane hybrid resin comprises reaction products of a composition comprising
   component A) 5 to 95 parts by weight, preferably 10 to 70 parts by weight, of one or more polyorganosiloxanes of the general formula $$R_a Si(OR')_b O_{(4-a-b/2)} \qquad \text{formula (I)}$$ 

with $0<a<2$, $0<b<2$ and $a+b<4$,
   optionally component B) 0-20 parts by weight, preferably 1-10 parts by weight, of one or more linear and/or branched polyorganosiloxanes of the formula $$R''O-[R'''_2 Si-O]_n- \qquad \text{formula (II)}$$ 

component C) 5 to 95 parts by weight, preferably 30 to 90 parts by weight, of an organic polymer,
   where $R_a$, $R'$, $R''$ and $R'''$ are each independently an alkyl radical having 1 to 8 carbon atoms or an aromatic radical having 6 to 20 carbon atoms and n is a number in the range from 4 to 250,
   at least one emulsifier based on partly hydrolysed polyvinylacetates.
   wherein said dispersion has a solids content of 30.0% by weight-70.0% by weight, preferably 45.0% by weight-55.0% by weight, based on the polyorganosiloxane hybrid resin dispersion, and the residual solvent content is <6.0% by weight, preferably <2.5% by weight, more preferably <1.0% by weight, based on the polyorganosiloxane hybrid resin dispersion.

2. Polyorganosiloxane hybrid resin dispersion according to embodiment 1, characterized in that the organic polymer is selected from the group of the polyepoxides, polyesters, polyacrylates and/or methacrylates and copolymers thereof, polyurethanes, cellulose derivatives, polysulfones, polyether sulfones, polyphenylene sulfides and oxides, polyamides, polyamide imide, polyimides, polyethers, aromatic and aliphatic glycidyl-functional polymers, oligomers, phenoxy resins, polycarbonates, ketone-formaldehyde resins, polyvinyl resins selected from polyvinyl alcohol, polyglycerols, polyvinylacetate, (partial) hydrolysates and derivatives thereof, phenolic resins, fluoropolymers, alkyd resins and mixtures thereof.

3. Polyorganosiloxane hybrid resin dispersion according to embodiment 1 or 2, characterized in that the organic polymer contains hydroxyl groups and/or acidic hydrogen.

4. Polyorganosiloxane hybrid resin dispersion according to any of embodiments 1-3, characterized in that the emulsifiers are partly hydrolysed polyvinylacetates having an alcoholysis level between 10%-99% (mol/mol), preferably between 50% and 95% (mol/mol), and more preferably between 70% and 90% (mol/mol).

5. Polyorganosiloxane hybrid resin dispersion according to any of embodiments 1-4, characterized in that the partly hydrolysed polyvinylacetates have a viscosity, measured in a 4% aqueous polyvinylacetate solution at 20° C. to DIN 53015, of 1-50 mPa s, preferably 1-40 mPa s and more preferably 1-30 mPa s.

6. Polyorganosiloxane hybrid resin dispersion according to any of the preceding embodiments, characterized in that it includes further emulsifiers selected from the group of the anionic, cationic, zwitterionic or nonionic emulsifiers.

7. Polyorganosiloxane hybrid resin dispersion according to any of the preceding embodiments, characterized in that the flashpoint of the dispersion by the method in the description is >30.0° C., preferably >60.0° C. and more preferably >90.0° C.

8. Polyorganosiloxane hybrid resin dispersion according to any of the preceding embodiments, characterized in that the weight ratio of polyorganosiloxane hybrid resin to emulsifier or emulsifier system is between 5-50, preferably between 7-40, more preferably between 10-30.

9. Polyorganosiloxane hybrid resin dispersion according to any of the preceding embodiments, characterized in that it includes further additives selected from defoamers, deaerating agents, rheology additives, preservatives, substrate wetting agents, crosslinkers, drying aids, catalysts, antioxidants, anti-skinning agents, anti-settling agents, thickeners, coalescing agents, film-forming aids, fillers, pigments and/or dispersants.

10. Polyorganosiloxane hybrid resin dispersion according to any of the preceding embodiments, characterized in that the preservatives used are fungicides, bactericides, pesticides, algicides and/or herbicides.

11. Polyorganosiloxane hybrid resin dispersion according to any of the preceding embodiments, characterized in that the average volume-weighted diameter of the polyorganosiloxane hybrid resin particles, measured to ISO 13320:2009, is between 0.1-10.0 μm, preferably between 0.1-2.0 μm, more preferably between 0.2-1.0 μm and most preferably between 0.2-0.7 μm.

12. Process for producing aqueous polyorganosiloxane hybrid resin dispersion, comprising the steps of
   a. emulsifying a polyorganosiloxane hybrid resin solution comprising an organic or semi-organic solvent with an emulsifier solution comprising at least one emulsifier based on partly hydrolysed polyvinylacetates and
   b. removing the solvent.

13. Process according to any of the preceding embodiments, characterized in that an aqueous emulsifier solution or an aqueous emulsifier system solution wherein the concentration is between 5-40% by weight, preferably 10-30% by weight, more preferably 15-25% by weight, based on the emulsifier solution, is used.

14. Process according to any of the preceding embodiments, characterized in that water is additionally added in step a).

15. Process according to any of the preceding embodiments, characterized in that the solids content for the aqueous polyorganosiloxane hybrid resin dispersion is adjusted after step b).

16. Process according to any of the preceding embodiments, characterized in that the polyorganosiloxane hybrid resin comprises reaction products of a composition comprising component A) 5 to 95 parts by weight, preferably 10 to 70 parts by weight, of one or more polyorganosiloxanes of the general formula

$$R_aSi(OR')_bO_{(4-a-b/2)} \quad \text{Formula (I)}$$

with $0<a<2$, $0<b<2$ and $a+b<4$, optionally component B) 0-20 parts by weight, preferably 1-10 parts by weight, of one or more linear and/or branched polyorganosiloxanes of the formula

$$R''O-[R'''_2Si-O]_n- \quad \text{Formula (II)}$$

component C) 5 to 95 parts by weight, preferably 30 to 90 parts by weight, of an organic polymer, where $R_a$, R', R'' and R''' are each independently an alkyl radical having 1 to 8 carbon atoms or an aromatic radical having 6 to 20 carbon atoms and n is a number in the range from 4 to 250.

17. Process according to any of the preceding embodiments, characterized in that the organic polymer comprises organic polymers containing hydroxyl groups, preferably selected from the group of the polyepoxides, polyesters, polyacrylates and/or methacrylates and copolymers thereof, polyurethanes, cellulose derivatives, polysulfones, polyether sulfones, polyphenylene sulfides and oxides, polyamides, polyamide imide, polyimides, polyethers, aromatic and aliphatic glycidyl-functional polymers, oligomers, phenoxy resins, polycarbonates, ketone-formaldehyde resins, polyvinyl resins selected from polyvinyl alcohol, polyglycerols, polyvinylacetate, (partial) hydrolysates and derivatives thereof, phenolic resins, fluoropolymers, alkyd resins and mixtures thereof.

18. Process according to any of the preceding embodiments, characterized in that the emulsifiers are partly hydrolysed polyvinylacetates having an alcoholysis level between 10%-99% (mol/mol), preferably between 50% and 95% (mol/mol), and more preferably between 70% and 90% (mol/mol).

19. Process according to any of the preceding embodiments, characterized in that the partly hydrolysed polyvinylacetates have a viscosity, measured in a 4% aqueous polyvinylacetate solution at 20° C. to DIN 53015, of 1-50 mPa s, preferably 1-40 mPa s and more preferably 1-30 mPa s.

20. Process according to any of the preceding embodiments, characterized in that further emulsifiers selected from the group of the anionic, cationic, zwitterionic or nonionic emulsifiers are used.

21. Process according to any of the preceding embodiments, characterized in that the solvent is at least one organic solvent that has been used in the preparation of the polyorganosiloxane hybrid resin or is at least one semi-organic solvent.

22. Process according to any of the preceding embodiments, characterized in that the organic solvent or mixtures thereof has a boiling point range of 50° C.-150° C., preferably 90° C.-120° C.

23. Process according to any of the preceding embodiments, characterized in that the solvent is removed by means of distillation under reduced pressure with or without stripping gas, steam distillation, or by means of a membrane process, a thin-film evaporator or a counter current process.

24. Process according to any of the preceding embodiments, characterized in that the polyorganosiloxane hybrid resin solution has a polyorganosiloxane hybrid resin concentration of 40.0% by weight-95.0% by weight, preferably 60.0% by weight-70.0% by weight, based on the polyorganosiloxane hybrid resin solution.

25. Process according to any of the preceding embodiments, characterized in that the flashpoint of the aqueous polyorganosiloxane hybrid resin dispersion produced by the process can be increased.

26. Use of the polyorganosiloxane hybrid resin dispersion according to any of embodiments 1-11 in coating materials, and also coatings and paints, substrate coatings, semi-finished products, adhesives, inks, sealants, compounding matrices and sizes.

27. Substrates, especially baking trays, baking tins, pans, metal pots and the like, coated with a composition comprising a dispersion according to any of embodiments 1 to 11.

DETAILED DESCRIPTION OF THE INVENTION

It has been found that, surprisingly, the dispersion according to the invention has a residual solvent content of <6.0% by weight, preferably <2.5% by weight, more preferably <1.0% by weight, based on the polyorganosiloxane hybrid resin dispersion at a solids content of 30.0% by weight-70.0% by weight, preferably 45.0% by weight-55.0% by weight, based on the polyorganosiloxane hybrid resin dispersion.

The solids contents chosen in accordance with the invention are particularly advantageous since they reflect user demands with regard to storage stability, use amount and freedom in formulation and use.

It was shown in a comparative example that dispersions produced by the process according to WO 2015/091901 at best reach a residual solvent content of 6% by weight at a solids content of 30.0% by weight based on the polyorganosiloxane hybrid resin dispersion. If the solids content is increased, this increases the residual solvent content in the dispersion.

In the context of the invention, the solids content consists of polyorganosiloxane hybrid resin and emulsifier.

A further advantage of the invention is the aspect of occupational safety. Even when products containing small amounts of inflammable solvent are used, some fundamental occupational protection measures are required. For instance, flashpoint is an important figure for taking occupational safety precautions. In order to avoid risks of fire and explosion, solvent-borne products having high flashpoint are preferred over products having low flashpoint.

It has been found that, surprisingly, the dispersion according to the invention makes a contribution to occupational safety. This is because the flashpoint increases as the residual solvent content in the dispersion decreases.

Preferably, the polyorganosiloxane hybrid resin dispersion according to the invention has a flashpoint by the method described in this application of >30.0° C., preferably >60.0° C. and more preferably >90.0° C.

In principle, the person skilled in the art classifies aqueous polymer dispersions as secondary and primary dispersions. Secondary dispersions form from polymers that are prepared conventionally and then converted to the aqueous dispersion from solution or melt in a subsequent step. By contrast, primary dispersions are those in which the polymer is itself obtained directly in disperse distribution in the aqueous dispersion medium in the presence of an emulsifier. What is common to all preparation processes is essentially that monomers are used in part to construct the polymer or that this construction is effected exclusively from such monomers.

EP 0 008 090 A1 describes a process for preparing a water-miscible silicone-polyester resin in which the stable dispersion is based on the use of an "acidified" polyester during the preparation of the silicone-polyester resin. As well as the very complex process, there is additionally the risk of re-dissociation of the polyester (acidic ester hydrolysis) as a result of the acid numbers of 25-110 that are required in this process.

The demands for a reduction in solvent emissions can be taken into account by the aqueous polyorganosiloxane hybrid resin dispersion according to the invention.

Preferably, the polyorganosiloxane hybrid resin is an organic polymer-modified polyorganosiloxane.

More preferably, the polyorganosiloxane hybrid resin comprises reaction products of a composition comprising
  component A) 5 to 95 parts by weight, preferably 10 to 70 parts by weight, of one or more polyorganosiloxanes of the general formula

$$R_a Si(OR')_b O_{(4-a-b/2)} \quad \text{Formula (I)}$$

with $0<a<2$, $0<b<2$ and $a+b<4$,
  optionally component B) 0-20 parts by weight, preferably 1-10 parts by weight, of one or more linear and/or branched polyorganosiloxanes of the formula

$$R''O—[R'''_2 Si—O]_n— \quad \text{Formula (II)}$$

component C) 5 to 95 parts by weight, preferably 30 to 90 parts by weight, of an organic polymer,
  where
  $R_a$, $R'$, $R''$ and $R'''$ are each independently an alkyl radical having 1 to 8 carbon atoms or an aromatic radical having 6 to 20 carbon atoms and n is a number in the range from 4 to 250.

The polyorganosiloxane hybrid resins can be prepared in a known manner. Standard processes can be found in DE 10 2013 218976 A1, DE 10 2013 218981A1, U.S. Pat. No. 3,154,597 or 3,170,962. The person skilled in the art is aware of further literature, for example "Silicone resins and their combination" by Wernfried Heilen, chapter 2.2 Silicone combination resins/silicone resin hybrids, 2015 or "High Silicones and Silicone-Modified Materials strength Silicone-Urethane Copolymers: Synthesis and Properties, Chapter 26, pp 395-407.

In this case, for example, either a polyorganosiloxane is reacted with an organic polymer containing hydroxyl groups or the organic polymer is prepared in the presence of the polyorganosiloxane by means of suitable monomers, or an organic polymer with alkoxysilane functionality by hydrolysis/condensation or equilibration with alkoxysilane monomers or siloxane oligomers.

Preferably, the polyorganosiloxane is a linear or singly or multiply branched Si—OH— or $SiOR^3$-functional polyorganosiloxane.

Polyorganosiloxanes are also referred to in the literature as siloxane oligomers, alkoxy-functional methyl-, phenyl- and methyl/phenylsiloxanes, hydroxy-functional methyl-, phenyl- and methyl/phenylsilicone resins or silanols.

Alkoxy-functional methyl-, phenyl- or else methyl/phenylsiloxane oligomers are obtainable from ShinEtsu, with trade names including KC-89S, KR-500, X 40-9225, X 40-9246, X 40-9250, KR-401N, X-40-9227, KR-510, KR-9218, KR-213.

Methoxy-functional methyl-, phenyl- and methyl/phenylsiloxanes are obtainable from Dow Corning under the trade names Dow Corning® US-CF 2403 Resin, US-CF 2405 Resin, 3037 Intermediate, 3074 Intermediate, RSN-5314 Intermediate. Silanol-functional methyl/phenyl resins are sold under the trade names RSN-0409 HS Resin, RSN-0431 HS Resin, RSN-0804 Resin, RSN-0805 Resin, RSN-0806 Resin, RSN-0808 Resin, RSN-0840 Resin.

Alkoxy-functional methyl/phenyl-, phenyl- and methylsilicone resins, which are also supplied in hydrolysed form to the corresponding silanol, are commercially available under the SILRES® trade name from Wacker Chemie, for instance with the additional designation REN 50, REN 60, REN 80, KX, HK 46, MSE 100 or SY 300, IC 836, REN 168, SY 409, IC 232, SY 231, IC 368, IC 678.

The preparation of silicone resins of these kinds has long been known in the literature (in this regard see W. Noll—Chemie und Technologie der Silicone [Chemistry and Technology of the Silicones], Wiley-VCH Verlag GmbH & Co. KGaA, Weinheim, 1960), and is also described in German patent specification DE 34 12 648.

The organic polymer preferably comprises polyepoxides, polyesters, polyacrylates and/or methacrylates and copolymers thereof, polyurethanes, cellulose derivatives, polysulfones, polyether sulfones, polyphenylene sulfides and oxides, polyamides, polyamide imide, polyimides, polyethers, aromatic and aliphatic glycidyl-functional polymers, oligomers, phenoxy resins, polycarbonates, ketone-formaldehyde resins, polyvinyl resins selected from polyvinyl alcohol, polyglycerols, polyvinylacetate, (partial) hydrolysates and derivatives thereof, phenolic resins, fluoropolymers, alkyd resins and mixtures thereof.

Preference is given to using polyesters selected from the reaction products of aromatic and/or aliphatic and/or cycloaliphatic monocarboxylic acids and/or dicarboxylic acids and/or polycarboxylic acids, and the anhydrides and/or esters thereof with linear and/or branched, aliphatic and/or cycloaliphatic and/or aromatic diols and/or polyols. Examples of customary carboxylic acids are phthalic acid, phthalic anhydride, dimethyl terephthalate, isophthalic acid, terephthalic acid, cyclohexane-1,4-dicarboxylic acid, succinic acid, succinic anhydride, sebacic acid, maleic acid, maleic anhydride, fumaric acid, methyltetrahydrophthalic acid, methyltetrahydrophthalic anhydride, methylhexahydrophthalic acid, methylhexahydrophthalic anhydride, hexahydrophthalic acid, tetrahydrophthalic acid, dodecanedioic acid, adipic acid, azelaic acid, isononanoic acid, 2-ethylhexanoic acid, pyromellitic acid, pyromellitic dianhydride, trimellitic acid and/or trimellitic anhydride. Examples of customary diols and or polyols are ethylene glycol, propane-1,2- and/or -1,3-diol, diethylene glycol, dipropylene glycol, triethylene glycol, tetraethylene glycol, butane-1,2- and/or -1,4-diol, butylethylpropane-1,3-diol, methylpropane-1,3-diol, pentane-1,5-diol, cyclohexanedimethanol, glycerol, hexanediol, neopentyl glycol, trimethylolethane, trimethylolpropane and/or pentaerythritol, and also bisphenol A, B, C. F, norbomylene glycol, 1,4-benzyldimethanol and -ethanol, 2,4-dimethyl-2-ethylhexane-1,3-diol.

Preference is given to using epoxy resins having at least two 1,2-epoxy groups per molecule.

Examples of suitable epoxy resins are aliphatic or aromatic epoxides: Eponex® and EPON® resins from Hexion, Epalloy® resins from Emerald Performance Materials Company, Epotec® resins from Aditya Birla Chemicals, Denacol® resins from Nagase ChemteX, Araldite® resins from Huntsman, Beckopox® from Allnex, VORAFORCE® resins from Dow Chemical Company.

The different fragments of the siloxane chains indicated in the formula (I) or formula (II) may be statistically distributed. Statistical distributions may have a block-wise construction with any number of blocks and any sequence or be subject to a randomized distribution, they may also have an alternating construction or else form a gradient along the chain, in particular they can also form any hybrids.

The indices recited herein and the value ranges for the indicated indices can be understood as meaning average values for the possible statistical distribution of the actual existing structures and/or mixtures thereof. This also applies to structural formulae reproduced per se exactly as such, for example formula (I).

The word fragment "poly" encompasses in the context of this invention not just compounds having at least 3 repeating units of one or more monomers in the molecule, but in particular also compositions of compounds having a molecular weight distribution and having an average molecular weight of at least 200 g/mol. This definition takes account of the fact that it is customary in the field of industry in question to refer to such compounds as polymers even if they do not appear to conform to a polymer definition as per OECD or REACH guidelines.

Unless stated otherwise, percentages are figures in percent by weight.

If measured values are reported hereinbelow, these measurements, unless stated otherwise, have been conducted under standard conditions (25° C. and 1013 mbar).

When average values are reported below, the values in question are weight averages, unless stated otherwise.

More preferably, the organic polymer contains hydroxyl groups and/or acidic hydrogens.

Preferably, the emulsifiers are partly hydrolysed polyvinylacetates having an alcoholysis level between 10%-99% (mol/mol), preferably between 50% and 95% (mol/mol), and more preferably between 70% and 90% (mol/mol).

Preferably, the partly hydrolysed polyvinylacetates have a viscosity, measured in a 4% aqueous polyvinylacetate solution at 20° C. to DIN 53015, of 1-50 mPa s, preferably 1-40 mPa s and more preferably 1-30 mPa s.

Preferably, the emulsifier does not include any bound silane.

It is also conceivable to use the emulsifiers according to the invention together with other emulsifiers, for example with anionic, cationic or non-ionic emulsifiers. If multiple emulsifiers are used, these should be regarded as an emulsifier system in the present invention.

The weight ratio of polyorganosiloxane hybrid resin to emulsifier or emulsifier system is preferably between 5-50, preferably between 7-40 and more preferably between 10-30.

If desired, the polyorganosiloxane hybrid resin dispersion preferably includes further additives selected from defoamers, deaerating agents, rheology additives, preservatives, substrate wetting agents, crosslinkers, drying aids, catalysts, antioxidants, anti-skinning agents, anti-settling agents, thickeners, coalescing agents, film-forming aids, fillers, pigments and/or dispersants.

Preferably, the pigments are organic or inorganic pigments or carbon black pigments. Examples of inorganic pigments include iron oxides, chromium oxides or titanium oxides. Suitable organic pigments are, for example, azo pigments, metal complex pigments, anthraquinoid pigments, phthalocyanine pigments, and polycyclic pigments, especially those of the thioindigo, quinacridone, dioxazine, pyrrolopyrrole, naphthalenetetracarboxylic acid, perylene, iso-amidolin(on)e, flavanthrone, pyranthrone or isoviolanthrone series. Carbon blacks used may be gas blacks, lamp blacks or furnace blacks. These carbon blacks may additionally be post-oxidized and/or converted to beads.

It is optionally possible to add further additives. An additive in this context is any component that has a positive effect on the properties of the dispersion according to the invention. It is possible to add one or more additives independently of one another. Listed hereinafter are some additives that can be used for the dispersion according to the invention. The enumeration is non-exhaustive. Additives usable advantageously are especially wetting and dispersing additives. A multitude of wetting and dispersing additives which can be used for the dispersions according to the invention are available on the market. These dispersing additives derive, for example, from the polymer classes that are sufficiently well known in the related art, such as styrene-maleic anhydride copolymers, acrylates, polyethers, e.g. styrene oxide polyethers, polyesters, amino polyesters, polyurethanes and amino polyethers. The additives may have different topologies, for example linear, branched, comb-like or star-shaped. Typically, wetting and dispersing additives have a heterogeneous structure divided into a bonding group and a stabilizing side-chain.

As well as pigments, it is also possible to use fillers in the dispersions according to the invention. Suitable fillers are, for example, those based on kaolin, talc, mica, other silicates, quartz, cristobalite, wollastonite, perlite, diatomaceous earth, fibrous fillers, aluminium hydroxide, barium sulfate, glass or calcium carbonate.

The use of a defoamer or deaerating agent may be advantageous in order to actively reduce the amount of air introduced in processing or production operations. Examples include those based on mineral oil or vegetable oil or based on polyether siloxanes, in some cases filled with particulate components, for example silica.

Examples of further additives may include binders, dyes, surface additives, compatibilizers, wetting and spreading agents, crosslinkers, rheology additives, thickeners. UV stabilizers and preservatives.

Preferably, the preservatives used are fungicides, bactericides, pesticides, algicides and/or herbicides.

Preferably, the average volume-weighted diameter of the polyorganosiloxane hybrid resin particles is between 0.1-10.0 µm, preferably between 0.1-2.0 µm, more preferably between 0.2-1.0 µm and most preferably between 0.2-0.7 µm, measured to ISO 13320:2009. For the present invention, the average volume-weighted diameter of the particles was determined with the aid of a Coulter LS 13320 instrument from Beckman Coulter.

Preferably, the polyorganosiloxane hybrid resin dispersion has a solids content of 30.0% by weight-70.0% by weight, preferably 45.0% by weight-55.0% by weight, based on the dispersion.

The invention further provides a process for producing aqueous polyorganosiloxane hybrid resin dispersion, comprising the steps of
  a. emulsifying a polyorganosiloxane hybrid resin solution comprising an organic solvent with an emulsifier solution comprising at least one emulsifier based on partly hydrolysed polyvinylacetates and
  b. removing the solvent.

Preference is given to additionally adding water in step a). For example, it is thus possible to fix the solids content in this step or at least to include it within a desired solids content range.

Preferably, after step b), it is possible to adjust the solids content for the aqueous polyorganosiloxane hybrid resin dispersion.

More preferably, it is possible both to include a desired solids content range in step a) and to set the solids content of the aqueous polyorganosiloxane hybrid resin dispersion of the invention after step b).

The method of the invention thus enables an elegant production method by which the solids content can be predetermined at the start. Fine adjustment, if required, can be included downstream.

Preference is given to using partly hydrolysed polyvinylacetates having an alcoholysis level between 10%-99% (mol/mol), preferably between 50% and 95% (mol/mol), and more preferably between 70% and 90% (mol/mol).

Preferably, the emulsifier does not include any bound silane.

Preferably, the partly hydrolysed polyvinylacetates have a viscosity, measured in a 4% aqueous polyvinylacetate solution at 20° C. to DIN 53015, of 1-50 mPa s, preferably 1-40 mPa s and more preferably 1-30 mPa s.

Such emulsifiers are available, for example, under the brand name Mowiol, Elvanol or Poval (from Kuraray), Gohsenol (from Nippon Gohsei), Selvol (from Sekisui), Polyviol (from Wacker).

It is preferably possible to use further emulsifiers selected from the group of the anionic, cationic, zwitterionic or nonionic emulsifiers.

Preferably, the polyorganosiloxane hybrid resin used comprises reaction products of a composition comprising component A) 5 to 95 parts by weight, preferably 10 to 70 parts by weight, of one or more polyorganosiloxanes of the general formula

$R_aSi(OR')_bO_{(4-a-b/2)}$    Formula (I)

with $0<a<2$, $0<b<2$ and $a+b<4$, optionally component B) 0-20 parts by weight, preferably 1-10 parts by weight, of one or more linear and/or branched polyorganosiloxanes of the formula

$R''O—[R'''_2Si—O]_n—$    Formula (II)

component C) 5 to 95 parts by weight, preferably 30 to 90 parts by weight, of an organic polymer, where $R_a$, R', R" and R''' are each independently an alkyl radical having 1 to 8 carbon atoms or an aromatic radical having 6 to 20 carbon atoms and n is a number in the range from 4 to 250.

Preferably, the polyorganosiloxane is a linear or singly or multiply branched Si—OH— or $SiOR^3$-functional polyorganosiloxane. Polyorganosiloxanes available on the market have been described above.

The organic polymer preferably comprises polyepoxides, polyesters, polyacrylates and/or methacrylates and copolymers thereof, polyurethanes, cellulose derivatives, polysulfones, polyether sulfones, polyphenylene sulfides and oxides, polyamides, polyamide imide, polyimides, polyethers, aromatic and aliphatic glycidyl-functional polymers, oligomers, phenoxy resins, polycarbonates, ketoneformaldehyde resins, polyvinyl resins selected from polyvinyl alcohol, polyglycerols, polyvinylacetate, (partial) hydrolysates and derivatives thereof, phenolic resins, fluoropolymers, alkyd resins and mixtures thereof.

More preferably, the organic polymer comprises organic polymers containing hydroxyl groups, preferably selected from the group of the polyepoxides, polyesters, polyacrylates, polymethacrylates, polyurethanes and cellulose derivatives.

Preference is given to using polyesters selected from the reaction products of aromatic and/or aliphatic and/or cycloaliphatic monocarboxylic acids and/or dicarboxylic acids and/or polycarboxylic acids, and the anhydrides and/or esters thereof with linear and or branched, aliphatic and/or cycloaliphatic and/or aromatic diols and/or polyols. Examples of customary carboxylic acids are phthalic acid, phthalic anhydride, dimethyl terephthalate, isophthalic acid, terephthalic acid, cyclohexane-1,4-dicarboxylic acid, succinic acid, succinic anhydride, sebacic acid, maleic acid, maleic anhydride, fumaric acid, methyltetrahydrophthalic acid, methyltetrahydrophthalic anhydride, methylhexahydrophthalic acid, methylhexahydrophthalic anhydride, hexahydrophthalic acid, tetrahydrophthalic acid, dodecanedioic acid, adipic acid, azelaic acid, isononanoic acid, 2-ethylhexanoic acid, pyromellitic acid, pyromellitic dianhydride, trimellitic acid and/or trimellitic anhydride. Examples of customary diols and or polyols are ethylene glycol, propane-1,2- and/or -1,3-diol, diethylene glycol, dipropylene glycol, triethylene glycol, tetraethylene glycol, butane-1,2- and/or -1,4-diol, butylethylpropane-1,3-diol, methylpropane-1,3-diol, pentane-1,5-diol, cyclohexanedimethanol, glycerol, hexanediol, neopentyl glycol, trimethylolethane, trimethylolpropane and/or pentaerythritol, and also bisphenol A. B, C, F, norbornylene glycol, 1,4-benzyldimethanol and -ethanol, 2,4-dimethyl-2-ethylhexane-1,3-diol.

Preference is given to using epoxy resins having at least two 1,2-epoxy groups per molecule. Examples of suitable epoxy resins are aliphatic or aromatic epoxides: Eponex® and EPON® resins from Hexion, Epalloy® resins from Emerald Performance Materials Company, Epotec® resins from Aditya Birla Chemicals, Denacol® resins from Nagase ChemteX, Araldite® resins from Huntsman, Beckopox® from Allnex, VORAFORCE® resins from Dow Chemical Company.

Preferably, the solvent is an organic solvent or mixtures of organic solvents that has been used in the preparation of the polyorganosiloxane hybrid resin.

The solvent may preferably also be a semi-organic solvent.

Preference is given to using a solvent from the group of the ketones selected from methyl ethyl ketone, acetone, methyl isobutyl ketone, diethyl ketone, methyl propyl ketone, cyclohexanone or methylcyclohexanone, esters selected from ethyl acetate, butyl acetate, ethyl propionate, isobutyl acetate or tert-butyl acetate, carbonates, for example dialkyl carbonates or cyclic carbonates such as ethylene carbonate, propylene carbonate or glycerol carbonate, aromatic hydrocarbons, for example xylene, cyclic hydrocarbons, for example cyclohexane, crown ethers or ethers, for example dibutyl ether, ester ethers, for example methoxypropyl acetate, siloxanes, for example hexamethyldisiloxane, octamethylcyclotetrasiloxane or decamethylcyclopentasiloxane, organometallic germanium compounds, for example tetramethylgermanium. It is conceivable to use other solvents known to those skilled in the art or mixtures of different solvents.

More preferably, the organic solvent or mixtures thereof at standard pressure or 1013 mbar has a boiling point range of 50° C.-150° C., preferably 90° C.-120° C.

Preferably, the solvent is removed by means of distillation under reduced pressure with or without stripping gas, by means of steam distillation, or by means of a (diffusion) membrane process or a thin-film evaporator.

Preferably, the polyorganosiloxane hybrid resin solution has a polyorganosiloxane hybrid resin concentration of 40.0% by weight-95.0% by weight, preferably 60.0% by weight-70.0% by weight, based on the polyorganosiloxane hybrid resin solution.

Preferably, an aqueous emulsifier solution or an aqueous emulsifier system solution wherein the concentration is between 5-40% by weight, preferably 10-30% by weight, more preferably 15-25% by weight, based on the emulsifier solution, is used.

The process according to the invention differs from the process of WO 2015/091901 in that the removal of the solvent takes place in the presence of the emulsifier solution. It was surprising that the solvent was removable to a significant degree from the polyorganosiloxane hybrid resin. Irrespective of the starting solvent concentration of the polyorganosiloxane hybrid resin, it was possible to generate small residual solvent contents without impairing the stability and hence the processibility of the polyorganosiloxane hybrid resin dispersion.

The process according to WO 2015/091901 describes in the first step the removal of the solvent of a silicone polyester hybrid resin, in the second step the homogenization of the still processible resin with a concentrated emulsifier solution, and in the third step dispersion by addition of water to produce the dispersion. The document is silent as to the temperature and duration in the first step. Thus, the advantage of the process according to the invention also lies in the reduction of the production steps, which leads to time savings.

The invention therefore also further provides the aqueous polyorganosiloxane hybrid resin dispersion of the invention, produced by the process according to the invention.

A further advantage of the process according to the invention is the increase in the flashpoint of an aqueous polyorganosiloxane hybrid resin dispersion produced by the process according to the invention.

The invention likewise provides for the utilization of the inventive polyorganosiloxane hybrid resin dispersion in coating materials as well as coatings and paints, substrate coatings, adhesives, structural adhesive, compounding matrices and sizes. Further fields of use are in the production of printing inks or 3D printing materials.

Substrates according to the invention, especially baking trays, baking tins, pans, metal pots and the like, coated with a composition comprising a polyorganosiloxane hybrid resin dispersion according to the invention are likewise encompassed. Substrates are preferably ceramic, polymeric or metallic substrates.

The subject-matter of the invention will be described by way of example below, without any intention that the invention be restricted to these illustrative embodiments.

Methods:

Measurement of Particle Size

The particle size of the dispersions is determined according to ISO 13320:2009. An LS13320 instrument from Beckman-Coulter was used. The particle size was calculated assuming a refractive index $n_d=1.51$. The calculated average particle diameter is volume-weighted.

Determination of Solids Content:

The content of non-volatile components is determined according to DIN EN ISO 3251:2008; in the context of the present invention, for the determination of the solids content, the testing of the polyorganosiloxanes and of the polyorganosiloxane hybrid resin solutions is conducted at 180° C. for 60 minutes, and for the dispersions at 105° C. for 60 minutes.

Viscosity Determination

Unless stated otherwise, viscosities were determined with the aid of a Brookfield LV-DV-I+ spindle viscometer. Brookfield viscometers are rotary viscometers with defined spindle sets as rotary bodies. The rotary bodies used were from an LV spindle set. Owing to the temperature dependence of viscosity, the temperatures of the viscometer and of the measuring liquid were kept constant during the measurement, with an accuracy of +/--0.5° C. Further materials used in addition to the LV spindle set were a thermostatable water bath, a 0-100° C. thermometer (scale divisions 1° C. or smaller) and a timer (scale values not greater than 0.1 second). For the measurement, 100 ml of the sample were charged to a wide-necked flask; the measurement was made under temperature-controlled conditions and in the absence of air bubbles, after prior calibration. To determine the viscosity, the viscometer was positioned relative to the sample such that the spindle dips into the product up to the mark. The measurement is initiated by activation of the start button, while care was taken to ensure that the measurement took place in the most favourable measurement region of 50% (+/−20%) of the maximum measurable torque. The result of the measurement was displayed by the viscometer in mPas, while division by the density (g/ml) gives the viscosity in $mm^2/s$.

Residual Solvent Content

The determination of the residual solvent content was conducted in accordance with European Pharmacopoeia 5.4 Residual solvents.

König Pendulum Hardness

For the König determination of pendulum hardness (DIN 53157 or EN ISO 1522), the measure used is the damping of a swinging pendulum. The pendulum with two stainless steel balls is placed onto a coating film. There is a physical relationship between the duration of pendulum swinging, amplitude, and the geometric dimensions of the pendulum. The viscoelastic behaviour of the coating is the decisive factor for the hardness. When the pendulum is set in swinging motion, the balls roll on the surface and thereby exert pressure on it. The greater or lesser recovery is dependent on the elasticity. The absence of elastic forces causes severe damping of the pendulum movement. High elastic forces, in contrast, cause only little damping.

"König" Pendulum Hardness:

Number of swings in osc.

1 oscillation=1.4 seconds

Further Conditions

Where % figures are given in the context of the present invention, the figures in question are in weight % unless stated otherwise. In the case of compositions, the % figures are based on the entire composition unless stated otherwise. Where averages are reported in the examples which follow, these are number averages unless stated otherwise. Where measurement values are reported hereinafter, these measurements, unless stated otherwise, have been determined under a pressure of 101 325 Pa, at a temperature of 23° C. and the ambient relative atmospheric humidity of about 40%.

Determination of Flashpoint:

The flashpoint was determined with the aid of a flashpoint tester with a closed crucible by the Pensky-Martens method, in accordance with DIN EN ISO 2719.

The Pensky-Martens flashpoint tester with a closed crucible measures the flashpoint. The lowest temperature at which an ignition source can ignite the vapour phase of a sample is read off here.

70 mL of each of the dispersions according to the invention from table 5 was used. Before the measurement, the samples were pre-treated as follows: the dispersions with a residual solvent content of >2.0% by weight were cooled to 10° C. and analysed immediately. Dispersions with a residual solvent content ≤2.0% were cooled to 15° C.

All dispersions were adjusted to a solids content of 50% by weight.

A heating rate of 1.5° C./min and a stirrer speed of 120 rpm were chosen. The air pressure was 994 mbar. No conversions were undertaken since the correction is smaller than the measurement inaccuracy.

Materials and Equipment:
glass panes, from Glaserei Glänzer, dimensions: 90×150×5 mm
PVC sheets, Mat. No: 4364002858, from KVG Kunststoff Betriebs GmbH
300 µm bar applicator, from Simex
300 µm cube applicator, from TQC GmbH
Dispermat, from VMA Getzmann with Teflon disc
wide-neck glass bottles
flashpoint tester with closed crucible—PMA 4 (semi-automatic), from Petrotest
Silikopon® EW, from Evonik Industries
Poval® 04-88, from Kuraray
Poval® 03-80, from Kuraray
Poval® 18-88, from Kuraray
Gohsenol® KL-03, from Nippon Gohsei
Gohsenol® KL-05, from Nippon Gohsei
Tergitol® 15-S-5, from DOW Chemical

EXAMPLES

Preparation of Aqueous Polyorganosiloxane Hybrid Dispersions According to the Invention For the preparation of the aqueous polyorganosiloxane hybrid dispersion according to the invention, a solvent-based polyorganosiloxane hybrid solution is first prepared. The solvent is then removed by the process according to the invention.

1. Preparation of a Solvent-Based Polyorganosiloxane Hybrid Solution with Polyester (this is Called Silicone-Polyester Hybrid Solution for Simplification Hereinafter)

1.1 Preparation of a Polyorganosiloxane as Component A
Solvents Used: Methyl Isobutyl Ketone (MIBK), Diethyl Carbonate (DEC), Methyl propyl ketone (MPK), ethyl acetate (EtAc), isobutyl acetate (iBuAc), ethyl isobutyrate (EtiBu).
First of all, three polyorganosiloxanes POS 1, POS 2 and POS 3 were prepared according to EP 0 157 318 with parameters from Table 1 below.
POS 4 is a commercially available polyorganosiloxane from Dow Corning.

TABLE 1

| Designation | Chemical name | Alkoxy content [%] | Viscosity [mPas] | Solvent | Solids content [%] |
|---|---|---|---|---|---|
| POS 1 | Phenylmethyl-methoxypoly-siloxane | 14.7 | 1760 | — | 95.7 |
| POS 2 | Phenylmethoxy-polysiloxane | 17.4 | 4470 | — | 98.4 |
| POS 3 | Phenylmethyl-ethoxy-polysiloxane | 15.1 | 450 | MIBK | 90.2 |
| POS 4 | Dow Corning® 3074 | 16.8 | 184 | — | 88.4 |

1.2 Preparation of a Hydroxy-Functional Polyester as Component C
The hydroxy-functional polyesters PES 1-PES 5 were prepared by a process described in DE 37 28 414 C1, by esterification of trimethylolpropane, isophthalic acid and ethylene glycol. The solids content and viscosity are adjusted with the solvents according to Table 2.

TABLE 2

| Polymer solution designation | Solvent | Viscosity [mPas] | Solids content [%] |
|---|---|---|---|
| PES 1 | EtiBu | 5930 | 70.2 |
| PES 2 | DEC | 6270 | 71.5 |
| PES 3 | MPK | 730 | 68.8 |
| PES 4 | MIBK | 860 | 70.4 |
| PES 5 | iBuAc | 4590 | 72.1 |

1.3 Preparation of Solvent-Based Silicone-Polyester Hybrid Solutions (Variant 1)
The silicone-polyester hybrid solutions SiPES 6-SiPES 11 were prepared by a process according to EP 0092701.
The silicone-polyester hybrid solution SiPES 12 was prepared by a process according to EP 1 072 660.
In this case, components A and C from Tables 1 and 2 were used. Table 3 shows further relevant data.

TABLE 3

| Designation | Polyorgano-siloxane | Polyester | Solvent | Silicone content [%] | Viscosity [mPas] | Solids content [%] |
|---|---|---|---|---|---|---|
| SiPES 6 | POS 1 | PES 1 | EtiBu | 30 | 18010 | 69.8 |
| SiPES 7 | POS 2 | PES 2 | DEC | 30 | 4270 | 61.8 |
| SiPES 8 | POS 2 | PES 3 | MPK | 30 | 1983 | 69.8 |
| SiPES 9 | POS 2 | PES 4 | MIBK | 30 | 2490 | 69.1 |
| SiPES 10 | POS 3 | PES 5 | iBuAc | 30 | 29740 | 70.4 |
| SiPES 11 | POS 3 | PES 3 | MPK | 50 | 2370 | 71.3 |
| SiPES 12 | POS 3 | PES 4 | MIBK | 80 | 2150 | 75.9 |

1.4 Preparation of Solvent-Based Silicone-Polyester Hybrid Solutions (Variant 2)
The silicone-polyester hybrid solutions SiPES 1-SiPES 5 were prepared by a process according to DE102013218981, Example 1.
In this case, the organic polymers were used as monomers. Table 4 shows relevant data of this silicone-polyester hybrid solution SiPES 1-SiPES 5.

TABLE 4

| Designation | Polyorgano-siloxane used | Solvent | Silicone content [%] | Viscosity [mPas] | Solids content [%] |
|---|---|---|---|---|---|
| SiPES 1 | POS 1 | MIBK | 30 | 7220 | 91.2 |
| SiPES 2 | POS 2 | MIBK | 30 | 6400 | 89.8 |
| SiPES 3 | DC 3074 | MIBK | 30 | 6530 | 90.4 |
| SiPES 4 | DC 3074 | EtAc | 30 | 6210 | 89.1 |
| SiPES 5 | DC 3074 | EtAc | 40 | 5740 | 88.4 |

1.5 Solvent-Based, Epoxy-Based Polyorganosiloxane Hybrid Solution (Called Silicone-Polyepoxide Hybrid Solution for Simplification Hereinafter)
Commercially available Silikopon® EW from Evonik Industries was used.

2. Preparation of Polyorganosiloxane Hybrid Dispersions
The abovementioned solvent-based silicone-polyester hybrid solutions (variants 1 and 2) and the abovementioned solvent-based silicone-polyepoxide hybrid solution, which are referred to as polyorganosiloxane hybrid resin in the method description below, were used.

2.1 Method 1, Inventive:

100.0 grams of a 20% solution of Poval® 4-88 in deionized water is initially charged in a vessel at room temperature. Subsequently, 360.0 grams of a polyorganosiloxane hybrid resin dissolved in appropriate amounts of solvent is added. The speed of the stirrer system here is 1000 rpm. The result is a highly viscous paste which, once the addition of the resin had ended, was stirred at 1000 rpm for a further 60 minutes. Subsequently, 140.0 grams of demineralized water is added. In the next step, the solvent is removed by distillation. For this purpose, the temperature is raised to 50° C. and the pressure is reduced to 40 mbar. Subsequently, the solids content of the dispersion is determined. The dispersion is subsequently adjusted to solids content 50.0% by addition of demineralized water with stirring.

2.2 Method 2, Inventive:

As method 1, except that the emulsifier solution is a 20% solution of Poval® 3-80 in deionized water.

2.3 Method 3, Inventive:

As method 1, except that the emulsifier solution is a 12.5% solution of Poval® 18-88 in deionized water.

2.4 Method 4, Inventive:

As method 1, except that the emulsifier solution is a 20% solution of Gohsenol® KL-03 in deionized water.

2.5 Method 5, Inventive:

As method 1, except that the emulsifier solution is a 20% solution of Gohsenol® KL-05 in deionized water.

2.6 Method 6, Inventive:

As method 1, except that 70.0 grams of a 20% solution of Poval® 4-88 in deionized water and 30.0 grams of a 50% solution of Tergitol® 15-S-5 in deionized water are initially charged in a vessel at room temperature.

Particle size, flashpoint and residual solvent content were determined for each dispersion E1-E30 prepared. The values can be found in Table 5.

All dispersions were adjusted to a solids content of 50% by weight.

TABLE 5

| Dispersion | Polyorganosiloxane hybrid resin | Method | Diameter [nm] | Flashpoint [° C.] | Residual solvent content [% by wt.] |
| --- | --- | --- | --- | --- | --- |
| E1 | SiPES 1 | 1 | 634 | >100 | 0.5 |
| E2 | SiPES 1 | 2 | 587 | >100 | 0.6 |
| E3 | SiPES 2 | 3 | 434 | >100 | 0.4 |
| E4 | SiPES 3 | 4 | 635 | >100 | 0.3 |
| E5 | SiPES 4 | 5 | 403 | >100 | 0.5 |
| E6 | SiPES 5 | 6 | 515 | >100 | 0.6 |
| E7 | SiPES 6 | 1 | 423 | >100 | 0.6 |
| E8 | SiPES 6 | 2 | 528 | >100 | 0.5 |
| E9 | SiPES 7 | 3 | 393 | >100 | 0.6 |
| E10 | SiPES 7 | 4 | 448 | >100 | 0.4 |
| E11 | SiPES 8 | 3 | 432 | >100 | 0.5 |
| E12 | SiPES 8 | 4 | 439 | >100 | 0.7 |
| E13 | SiPES 8 | 1 | 695 | >100 | 0.3 |
| E14 | SiPES 8 | 1 | 854 | >100 | 0.1 |
| E15 | SiPES 8 | 3 | 545 | 49 | 3.3 |
| E16 | SiPES 9 | 1 | 603 | >100 | 0.9 |
| E17 | SiPES 9 | 2 | 719 | >100 | 0.2 |
| E18 | SiPES 9 | 3 | 727 | >100 | 0.3 |
| E19 | SiPES 9 | 4 | 728 | >100 | 0.3 |
| E20 | SiPES 10 | 5 | 472 | >100 | 0.5 |
| E21 | SiPES 11 | 1 | 503 | >100 | 0.4 |
| E22 | SiPES 11 | 1 | 628 | 42 | 2.0 |
| E23 | SiPES 11 | 1 | 625 | 31 | 4.0 |
| VE24 | SiPES 11 | 1 | 729 | 23 | 6.1 |
| E25 | SiPES 12 | 4 | 607 | >100 | 0.2 |
| E26 | Silikopon EW | 1 | 564 | >100 | 0.1 |
| E27 | Silikopon EW | 2 | 434 | >100 | 0.2 |
| E28 | Silikopon EW | 3 | 397 | >100 | 0.2 |
| E29 | Silikopon EW | 4 | 494 | >100 | 0.3 |
| E30 | Silikopon EW | 5 | 827 | >100 | 0.5 |

The residual solvent content of the dispersions according to the invention was below 6% by weight. The flashpoints of the dispersions according to the invention were higher in all cases than the flashpoint of the comparative example (VE24). Especially in the case of the dispersions according to the invention having a residual solvent content of <1% by weight, the flashpoint of >100° C. was reported since the dispersions boiled here owing to the water content and it was not possible to determine a flashpoint.

Comparative example VE24 was a dispersion having a residual solvent content of 6.1% by weight and a solids content of 50% by weight. In order to produce VE24 with this residual solvent content, the process according to the invention was conveniently ended early. The flashpoint was correspondingly lower.

It was thus possible to find that the process according to the invention can increase the flashpoint of an aqueous polyorganosiloxane hybrid resin dispersion.

3. Delimitation from WO 2015/091901, Called "Wacker" Hereinafter

A silicone-modified polyester resin according to Wacker Examples 5, 6, 7, 10, 11 and 12, having a solvent content of 40% by weight, was used and a dispersion was produced by the "Wacker" process.

For this purpose, the silicone polyester resin was distilled under reduced pressure at a maximum of 90° C. until the resin mass assumed a viscosity at which the resin was still processable. Processability is required in order to enable the emulsifying in the next step. Since WO 2015/091901 did not disclose any details with regard to temperature and duration, a temperature below the boiling point of water was used. The solids content was then determined:

it was found that the resin mass was no longer processable over and above a solids content of 85% by weight. It was no longer emulsifiable.

At a maximum solids content of 80% by weight, the resin mass still has adequate processability, which was used for the production of a dispersion with a solids content of 30% by weight based on the polyorganosiloxane hybrid resin dispersion. This dispersion theoretically results in a residual solvent content of 6% by weight. It is conceivable to reduce the residual solvent content of this dispersion by diluting with additional water, but this reduces the solids content of the dispersion correspondingly.

It is therefore not possible to use the process according to WO 2015/091901 in order thus to arrive at the dispersion according to the invention.

Performance Tests

1. Application and Curing Methods 1.1 Method 1: 2-Component Isocyanate Crosslinking The inventive dispersions E1-E15 were mixed with Bayhdur® 3100 in a ratio of 3:1 and drawn down with the aid of a spiral coating bar onto Q-Panel® aluminium colour test panels from Q-Lab (Alloy 3003H14: 0.025" thick (0.6 mm); bare mill finish). The wet film thickness is 100 μm. After drying at room temperature for 24 hours, the result is clear, defect-free films with dry film thickness 50 µm. The test panels were aged at 23° C. and 65% relative humidity for 10 days.

1.2 Method 2: Thermal Crosslinking

The inventive dispersions E16-E23 and E25-E30 are drawn down with the aid of a spiral coating bar onto Q-Panel® aluminium colour test panels from Q-Lab (Alloy 3003H14; 0.025" thick (0.6 mm); bare mill finish). The wet film thickness is 100 µm. After drying at room temperature for 0.5 hours, the result is clear, defect-free films with dry film thickness 50 µm. After this flash-off time at room temperature, the air-dried test panels were baked in an air circulation oven at 250° C. for 15 minutes.

Analogously, the solvent-based SiPES 1, SiPES 2, SiPES 8, SiPES 9 and SiPES 12 were applied and cured.

4. Measurement of Pendulum Hardness

The films were characterized by means of König pendulum hardness (DIN 53 157). The values can be found in Table 6.

TABLE 6

Pendulum hardness

| Dispersion | Curing method | Pendulum hardness |
|---|---|---|
| E1 | 1 | 134 |
| E2 | 1 | 120 |
| E3 | 1 | 133 |
| E4 | 1 | 126 |
| E5 | 1 | 126 |
| E6 | 1 | 127 |
| E7 | 1 | 139 |
| E8 | 1 | 132 |
| E9 | 1 | 121 |
| E10 | 1 | 119 |
| E11 | 1 | 129 |
| E12 | 1 | 145 |
| E13 | 1 | 134 |
| E14 | 1 | 122 |
| E15 | 1 | 139 |
| E16 | 2 | 157 |
| E17 | 2 | 163 |
| E18 | 2 | 162 |
| E19 | 2 | 168 |
| E20 | 2 | 162 |
| E21 | 2 | 158 |
| E22 | 2 | 166 |
| E23 | 2 | 155 |
| E25 | 2 | 160 |
| E26 | 2 | 159 |
| E27 | 2 | 160 |
| E28 | 2 | 171 |
| E29 | 2 | 158 |
| E30 | 2 | 155 |
| Comparative examples, solvent-based | | |
| SiPES 1 | 1 | 129 |
| SiPES 2 | 1 | 132 |
| SiPES 8 | 2 | 159 |
| SiPES 9 | 2 | 168 |
| SiPES 12 | 2 | 161 |

It has been found that the aqueous dispersions according to the invention have pendulum hardness values that are just as good as the solvent-based polyorganosiloxane hybrid resins. Pendulum hardness is important because it gives a direct conclusion as to the durability in use of the final coating of the polyorganosiloxane hybrid resin dispersion according to the invention.

The invention claimed is:

1. An aqueous polyorganosiloxane hybrid resin dispersion, comprising:
at least one polyorganosiloxane hybrid resin which comprises a reaction product of a composition, comprising:
component A) 5 to 95 parts by weight of one or more polyorganosiloxanes of the general formula:

$R_aSi(OR')_bO_{(4-a-b/2)}$   formula (I)

wherein 0<a<2, 0<b<2 and a+b<4,
component B) 1-20 parts by weight of one or more linear and/or branched polyorganosiloxanes of the formula

$R''O—[R'''_2Si—O]_n—$   formula (II)

where R" and R''' are each independently an alkyl radical having 1 to 8 carbon atoms or an aromatic radical having 6 to 20 carbon atoms and n is a number in the range from 4 to 250, and
component C) 5 to 95 parts by weight of an organic polymer containing hydroxyl groups selected from the group consisting of polyepoxides, polyesters, polyacrylates and/or methacrylates and copolymers thereof, polyurethanes, cellulose derivatives, polysulfones, polyether sulfones, polyphenylene sulfides and oxides, polyamides, polyamide imide, polyimides, polyethers, aromatic and aliphatic glycidyl-functional polymers, and oligomers thereof, phenoxy resins, polycarbonates, ketone-formaldehyde resins, polyvinyl resins, phenolic resins, fluoropolymers, alkyd resins, and mixtures thereof,
wherein R and R' are each independently an alkyl radical having 1 to 8 carbon atoms or an aromatic radical having 6 to 20 carbon atoms, and
at least one emulsifier comprising a partly hydrolysed polyvinylacetate,
wherein the aqueous polyorganosiloxane hybrid resin dispersion has a solids content of 30.0%-70.0% by weight, based on the aqueous polyorganosiloxane hybrid resin dispersion, and a residual solvent content of <6.0% by weight, based on the aqueous polyorganosiloxane hybrid resin dispersion,
said reaction product is a reaction of said polyorganosiloxane A) with hydroxyl groups of said organic polymer C) containing hydroxyl groups, and
a weight ratio of said polyorganosiloxane hybrid resin to emulsifier is between 5-50:1.

2. The aqueous polyorganosiloxane hybrid resin dispersion according to claim 1, wherein the organic polymer contains acidic hydrogen.

3. The aqueous polyorganosiloxane hybrid resin dispersion according to claim 1, wherein the partly hydrolysed polyvinylacetate has an alcoholysis level between 10%-99% (mol/mol).

4. The aqueous polyorganosiloxane hybrid resin dispersion according to claim 1, wherein the partly hydrolysed polyvinylacetate has a viscosity, measured in a 4% aqueous polyvinylacetate solution at 20° C. to DIN 53015, of 1-50 mPa s.

5. The aqueous polyorganosiloxane hybrid resin dispersion according to claim 1, wherein the aqueous polyorganosiloxane hybrid resin dispersion further comprises an additional emulsifier selected from the group consisting of the anionic, cationic, zwitterionic, nonionic emulsifiers, and mixtures thereof.

6. The aqueous polyorganosiloxane hybrid resin dispersion according to claim 1, wherein the flashpoint of the aqueous polyorganosiloxane hybrid resin dispersion is >30.0° C.

7. The aqueous polyorganosiloxane hybrid resin dispersion according to claim 1, wherein the aqueous polyorganosiloxane hybrid resin dispersion further comprises an additive selected from the group consisting of defoamers, deaerating agents, rheology additives, preservatives, substrate wetting agents, crosslinkers, drying aids, catalysts, antioxidants, anti-skinning agents, anti-settling agents, thickeners, coalescing agents, film-forming aids, fillers, pigments, dispersants, and mixtures thereof.

8. The aqueous polyorganosiloxane hybrid resin dispersion according to claim 7, wherein the additive is a preservative selected from the group consisting of fungicides, bactericides, pesticides, algicides, herbicides, and mixtures thereof.

9. The aqueous polyorganosiloxane hybrid resin dispersion according to claim 1, wherein said polyorganosiloxane hybrid resin is presented as particles in said dispersion having an average volume-weighted diameter measured according to ISO 13320:2009, of between 0.1-10.0 μm.

10. A coating material, a coating, paint, substrate coating, semifinished product, adhesive, ink, sealant, compounding matrix, or size, comprising:
the polyorganosiloxane hybrid resin dispersion according to claim 1.

11. A substrate, coated with a composition comprising the aqueous polyorganosiloxane hybrid resin dispersion according to claim 1.

12. The aqueous polyorganosiloxane hybrid resin dispersion according to claim 1, wherein said organic polymer is at least one polyvinyl resin selected from the group consisting of polyvinyl alcohol, polyglycerols, polyvinylacetate, and (partial) hydrolysates and derivatives thereof.

13. The aqueous polyorganosiloxane hybrid resin dispersion according to claim 1, wherein component C) is an organic polymer selected from the group consisting of polyepoxides, polyesters, polyacrylates and/or methacrylates and copolymers thereof, polyurethanes, cellulose derivatives, polysulfones, polyether sulfones, polyphenylene sulfides and oxides, polyamides, polyamide imide, polyimides, polyethers, aromatic and aliphatic glycidyl-functional polymers, and oligomers thereof, phenoxy resins, polycarbonates, ketone-formaldehyde resins, phenolic resins, fluoropolymers, alkyd resins, and mixtures thereof.

* * * * *